US012654587B2

(12) United States Patent
Song

(10) Patent No.: US 12,654,587 B2
(45) Date of Patent: Jun. 16, 2026

(54) APPARATUS AND METHOD FOR CONVERTING AND DISTRIBUTING REGENERATIVE POWER

(71) Applicants: HYUNDAI MOTOR COMPANY, Seoul (KR); KIA CORPORATION, Seoul (KR)

(72) Inventor: Kyeong Soo Song, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/952,493

(22) Filed: Nov. 19, 2024

(65) Prior Publication Data

US 2025/0360832 A1 Nov. 27, 2025

(30) Foreign Application Priority Data

May 24, 2024 (KR) ........................ 10-2024-0067868

(51) Int. Cl.
B60L 55/00 (2019.01)
B60L 7/10 (2006.01)
B60L 58/12 (2019.01)

(52) U.S. Cl.
CPC ................. B60L 55/00 (2019.02); B60L 7/10 (2013.01); B60L 58/12 (2019.02); *B60L 2210/44* (2013.01); *Y04S 10/126* (2013.01)

(58) Field of Classification Search
CPC .. B60L 55/00; B60L 7/10; B60L 58/12; B60L 2210/44; Y04S 10/126
See application file for complete search history.

(56) References Cited

FOREIGN PATENT DOCUMENTS

KR 10-2023-0033427 A 3/2023

*Primary Examiner* — Daniel Cavallari
(74) *Attorney, Agent, or Firm* — Morgan, Lewis & Bockius LLP

(57) ABSTRACT

An apparatus for converting and distributing regenerative power includes: a controller configured to permit or restrict a V2L function depending on a state of charge (SOC) value of a battery, compare regenerative power generated from a motor according to regenerative braking with a preset electric load required power and/or a V2L required power, and control an operation of converting the regenerative power according to a comparison result and distribution of the converted regenerative power; an inverter configured to convert the regenerative power into at least one power of a first power for an electric load, a second power for a V2L terminal, and power of the battery; and a main distributor configured to distribute the first power to the electric load terminal when the V2L function is restricted.

20 Claims, 14 Drawing Sheets

APPARATUS AND METHOD FOR CONVERTING AND DISTRIBUTING REGENERATIVE POWER

CROSS-REFERENCE TO RELATED APPLICATION(S)

The present application claims priority to Korean Patent Application No. 10-2024-0067868 filed on May 24, 2024, the entire contents of which is incorporated herein for all purposes by this reference.

BACKGROUND OF THE PRESENT DISCLOSURE

Field of the Present Disclosure

The present disclosure relates to an apparatus and a method for converting and distributing regenerative power which may be applied to an electric vehicle.

Description of Related Art

Generally, regenerative braking, or power regenerative braking is a general term for an electric braking method of converting kinetic energy into electrical energy and recovering the energy and exerting braking power in a manner in which a motor operates as a generation unit by turning a rotor attached to a wheel using inertial force when a motor (an electric motor) moving with torque force is in a closed loop state.

In the present manner, because a regenerative power RGPW voltage obtained through the regenerative braking is lower than a high-voltage battery voltage under normal driving conditions, the voltage should be converted to a voltage level of a high-voltage battery through an inverter for storage in a battery.

Meanwhile, an electric vehicle may be provided with a Vehicle To Load (V2L) function. An electric vehicle with an existing V2L function converts a battery voltage into commercial voltage and provides the voltage to a V2L power terminal.

However, in existing electric vehicles, when using both regenerative braking and V2L functions, to supply V2L power or electrical load using regenerative power by regenerative braking, since the voltage should first be stored in a battery, existing electric vehicles may undergo a process in which regenerative power voltage is converted into a voltage which may be stored in the battery, and again, the battery voltage is converted into the V2L power supply voltage or the electric load voltage, and accordingly, to supply the V2L power or the electric load power using the regenerative power, the existing electric vehicle should undergo two energy conversion processes, which may decrease energy efficiency thereof and also increase the heating value ($=current^2*resistance*time$).

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an apparatus and a method for converting and distributing regenerative power, which may use regenerative power generated during regenerative braking to directly supply power for electric loads and/or V2L power without storing voltage in a battery.

The aspects to be solved by the present disclosure are not limited to the above-mentioned aspects, and other aspects not mentioned herein will be clearly understood by those skilled in the art from the following description.

According to an aspect of the present disclosure, provided is an apparatus for converting and distributing regenerative power including: a controller configured to permit or restrict a V2L function depending on a state of charge (SOC) value of a battery, compare regenerative power generated from a motor according to regenerative braking with a preset electric load required power and/or a V2L required power, and control an operation of converting the regenerative power according to a comparison result and distribution of the converted regenerative power; an inverter operatively connected to the controller and configured to convert the regenerative power into at least one power of a first power for an electric load, a second power for a V2L terminal, and power of the battery, under the control of the controller; and a main distributor operatively connected to the controller and configured to distribute the first power, the second power, and the power of the battery to an electric load terminal, the V2L terminal, and the battery in response that the V2L function is permitted, and distribute the first power to the electric load terminal in response that the V2L function is restricted, under the control of the controller.

According to an aspect of the present disclosure, the apparatus for converting and distributing regenerative power may further include a converter operatively connected to the controller and configured to convert the power of the battery into a third power for an electric load or a fourth power for a V2L terminal under the control of the controller in response that the regenerative power is insufficient, as compared to a predetermined required power, according to the comparison result in the controller; and a sub-distributor operatively connected to the controller and configured to distribute the third power to the electric load terminal or distribute the fourth power to the V2L terminal, under the control of the controller, in response that the regenerative power is insufficient, as compared to the predetermined required power.

According to an aspect of the present disclosure, the apparatus for converting and distributing regenerative power may further include regenerative power detection unit configured to detect the regenerative power generated from the motor; and an SOC detection unit configured to detect the state of charge of the battery.

According to an aspect of the present disclosure, the controller includes: an operation mode determination unit configured to determine a first operation mode of permitting the V2L function or a second operation mode of restricting the V2L function depending on the state of charge of the battery; a power state determination unit configured to determine a power state as one of a first power state, a second power state, and a third power state according to a comparison result, by comparing the regenerative power, the electric load required power, and the V2L required power in the first operation mode, and determine a power state as one of a fourth power state and a fifth power state according to a comparison result, by comparing the regenerative power and the electric load required power in the second operation mode; and a control signal generation unit configured to generate a first control signal for controlling the inverter, a second control signal for controlling the main distributor, a third control signal for controlling the converter, and a fourth control signal for controlling the sub-distributor, according to determination of the power state determination unit.

According to an aspect of the present disclosure, the operation mode determination unit includes: a first comparator configured to compare the state of charge and a reference state of charge, and output a mode signal for determining a first operation mode of permitting the V2L function in response that the state of charge is greater than or equal to the reference state of charge, and output a mode signal for determining a second operation mode of restricting the V2L function in response that the state of charge is less than the reference state of charge.

According to an aspect of the present disclosure, the power state determination unit includes: an addition unit configured to obtain a total required power by adding the preset electric load required power and the V2L required power; a first determination unit configured to, in a case of the first operation mode, which is a mode of permitting the V2L function, determine the power state as the first power state in response that the regenerative power is greater than or equal to the total required power; a second determination unit configured to determine the power state as the second power state in response that the regenerative power is lower than the total required power and is greater than or equal to the electric load required power; a third determination unit configured to determine the power state as the third power state in response that the regenerative power is lower than the electric load required power; a fourth determination unit configured to, in a case of the second operation mode, determine the power state as the fourth power state in response that the regenerative power is greater than or equal to the electric load required power; and a fifth determination unit configured to, in a case of the second operation mode, determine the power state as the fifth power state in response that the regenerative power is lower than the electric load required power.

According to an aspect of the present disclosure, the control signal generation unit is configured to: in response that the power state is determined as the first power state in the power state determination unit, generate a first control signal for controlling first power conversion and second power conversion of the inverter, and a second control signal for transmitting the first power of the inverter to a charge load terminal and transmitting the second power of the inverter to the V2L terminal; in response that the power state is determined as the second power state in the power state determination unit, generate the first control signal for controlling the first power conversion and the second power conversion of the inverter, the second control signal for transmitting the first power of the inverter to the charge load terminal and transmitting the second power of the inverter to the V2L terminal, a third control signal for controlling fourth power conversion of the converter, and a fourth control signal for transmitting the fourth power of the converter to the V2L terminal; in response that the power state is determined as the third power state in the power state determination unit, generate the first control signal for controlling the first power conversion of the inverter, the second control signal for transmitting the first power of the inverter to the charge load terminal, a third control signal for controlling third power conversion of the converter, and a fourth control signal for transmitting the third power of the converter to the electric load terminal; in response that the power state is determined as the fourth power state in the power state determination unit, generate the first control signal for controlling the first power conversion of the inverter, and the second control signal for transmitting the first power of the inverter to the electric load terminal; and the power state is determined as the fifth power state in the power state determination unit, generate the first control signal for controlling the first power conversion of the inverter, the second control signal for transmitting the first power of the inverter to the charge load terminal, the third control signal for controlling the third power conversion of the converter, and the fourth control signal for transmitting the third power of the converter to the electric load terminal.

According to an aspect of the present disclosure, the inverter includes: a first inverter operating under the control of the controller to convert the regenerative power into a first power for an electric load; and a second inverter operating under the control of the controller to convert the regenerative power into a second power for V2L power.

According to an aspect of the present disclosure, the converter includes: a first converter operating under the control of the controller to convert the power of the battery into a third power for an electric load; and a second converter operating under the control of the controller to convert the power of the battery into a fourth power for V2L power.

According to an aspect of the present disclosure, the main distributor includes: a first distributor configured to transmit the first power of the first inverter to the charge load terminal under the control of the controller; and a second distributor configured to transmit the second power of the second inverter to the V2L terminal under the control of the controller.

According to an aspect of the present disclosure, wherein the sub-distributor includes: a third distributor configured to transmit the third power of the first converter to the electric load terminal under the control of the controller; and a fourth distributor configured to transmit the fourth power of the second converter to the V2L terminal under the control of the controller.

Additionally, according to an aspect of the present disclosure, provided is a method for converting and distributing regenerative power, including: a power distribution control operation of permitting or restricting, by a controller, a V2L function depending on a state of charge (SOC) value of a battery, and comparing regenerative power generated from a motor according to regenerative braking with a preset electric load required power and/or a V2L required power, and controlling an operation of converting the regenerative power according to a comparison result and distribution of the converted regenerative power; an inverter operating operation of converting the regenerative power into at least one power of a first power for an electric load, a second power for a V2L terminal, and power of the battery, under control of the controller; and a main power distribution operation of distributing the first power, the second power, and the power of the battery to an electric load terminal, the V2L terminal, and the battery in response that the V2L function is permitted, and distributing the first power to the electric load terminal in response that the V2L function is restricted, under the controller of the controller.

According to an aspect of the present disclosure, the method for converting and distributing regenerative power may further include a converter operating operation of converting the power of the battery into a third power for the electric load or a fourth power for a V2L terminal under control of the controller in response that the regenerative power is insufficient, as compared to a predetermined required power, according to the comparison result in the power distribution control operation; and a sub-power distribution operation of distributing the third power to the electric load terminal or distributing the fourth power to the V2L terminal, under the control of the controller, in response that the regenerative power is insufficient.

According to an aspect of the present disclosure, the power distribution control operation includes: an operation mode determination operation of determining a first operation mode of permitting the V2L function or a second operation mode of restricting the V2L function depending on the state of charge of the battery; a power state determination operation of, in the first operation mode, determining a power state as one of a first power state, a second power state, and a third power state according to a comparison result, by comparing the regenerative power, the electric load required power, and the V2L required power, and in the second operation mode, determining one of a fourth power state and a fifth power state according to a comparison result, by comparing the regenerative power and the electric load required power; and a control signal generation operation of generating a first control signal for controlling the inverter, a second control signal for controlling the main distributor, a third control signal for controlling a converter, and a fourth control signal for controlling a sub-distributor, according to the determination of the power state determination operation.

According to an aspect of the present disclosure, in the operation mode determining operation, the state of charge is compared with a reference state of charge, and in response that the state of charge is greater than or equal to the reference state of charge, a mode signal for determining a first operation mode of permitting the V2L function is outputted, and in response that the state of charge is less than the reference state of charge, a mode signal for determining a second operation mode of restricting the V2L function is outputted.

According to an aspect of the present disclosure, the power state determination operation includes: an addition operation of obtaining a total required power by adding the electric load required power and the V2L required power; and a power state determination operation of determining a power state of the regenerative power by comparing the regenerative power with at least one of the total required power, the electric load required power, and the V2L required power, in the first operation mode or the second operation mode, and in the power state determination operation, in a case of the first operation mode, which is a mode of permitting the V2L function, the power state is determined as the first power state in response that the regenerative power is greater than or equal to the total required power, the power state is determined as the second power state in response that the regenerative power is lower than the total required power and is greater than or equal to the electric load required power, the power state is determined as the third power state in response that the regenerative power is lower than the electric load required power, in a case of the second operation mode, the power state is determined as the fourth power state in response that the regenerative power is greater than or equal to the electric load required power, and the power state is determined as the fifth power state in response that the regenerative power is lower than the electric load required power.

According to an aspect of the present disclosure, in the control signal generation operation, in response that the power state is determined as the first power state in the power state determination operation, a first control signal for controlling first power conversion and second power conversion of the inverter, and a second control signal for transmitting the first power of the inverter to a charge load terminal and transmitting the second power of the inverter to the V2L terminal are generated, in response that the power state is determined as the second power state in the power state determination operation, the first control signal for controlling the first power conversion and the second power conversion of the inverter, the second control signal for transmitting the first power of the inverter to the charge load terminal and transmitting the second power of the inverter to the V2L terminal, a third control signal for controlling fourth power conversion of the converter, and a fourth control signal for transmitting the fourth power of the converter to the V2L terminal are generated, in response that the power state is determined as the third power state in the power state determination operation, the first control signal for controlling the first power conversion of the inverter, the second control signal for transmitting the first power of the inverter to the charge load terminal, a third control signal for controlling third power conversion of the converter, and a fourth control signal for transmitting the third power of the converter to the electric load terminal are generated, in response that the power state is determined as the fourth power state in the power state determination operation, the first control signal for controlling the first power conversion of the inverter, and the second control signal for transmitting the first power of the inverter to the electric load terminal are generated, and in response that the power state is determined as the fifth power state in the power state determination operation, the first control signal for controlling the first power conversion of the inverter, the second control signal for transmitting the first power of the inverter to the charge load terminal, the third control signal for controlling the third power conversion of the converter, and the fourth control signal for transmitting the third power of the converter to the electric load terminal are generated.

According to an aspect of the present disclosure, the inverter operating operation includes: a first inverter operating operation of operating under the control of the controller to convert the regenerative power into a first power for an electric load; and a second inverter operating operation of operating under the control of the controller to convert the regenerative power into a second power for V2L power.

According to an aspect of the present disclosure, the main power distribution operation includes: a first distribution operation of transmitting the first power of the first inverter to the charge load terminal under the control of the controller; and a second distribution operation of transmitting the second power of the second inverter to the V2L terminal under the control of the controller.

According to an aspect of the present disclosure, the main power distribution operation includes: a first converter operating operation of converting the power of the battery into a third power for the electric load under the control of the controller in response that the regenerative power is insufficient, as compared to the electric load required power; and a second converter operating operation of, in a first operation mode of permitting the V2L function, converting the power of the battery into a fourth power for the V2L power under the control of the controller in response that the regenerative power is insufficient as compared with a total required power obtained by adding the electric load required power and the V2L required power and exceeds the electric load required power, and the sub-power distribution operation includes: a third distribution operation of transmitting the third power of the first converter to the electric load terminal under the control of the controller; and a fourth distribution operation of transmitting the fourth power of the second converter to the V2L terminal under control of the controller.

Additionally, aspects of the present disclosure are not limited to the aspects exemplified above, and other aspects may be additionally understood in the process described below.

According to an aspect of the present disclosure, the regenerative power generated during regenerative braking may be used to directly supply the voltage as power for an electric load and/or power for V2L without storing the voltage in the battery.

Additionally, there is an advantage in that the heating value generated while using regenerative power during regenerative braking may be relatively reduced, so that electricity bills for electric vehicles may be saved and the durability of a power conversion system may be improved, and also, this may contribute to improving driver convenience and strengthening the marketability of electric vehicles in the future.

Advantages and effects of the present application are not limited to the above-mentioned aspects, and other effects not mentioned herein will be clearly understood by those skilled in the art from the following description.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
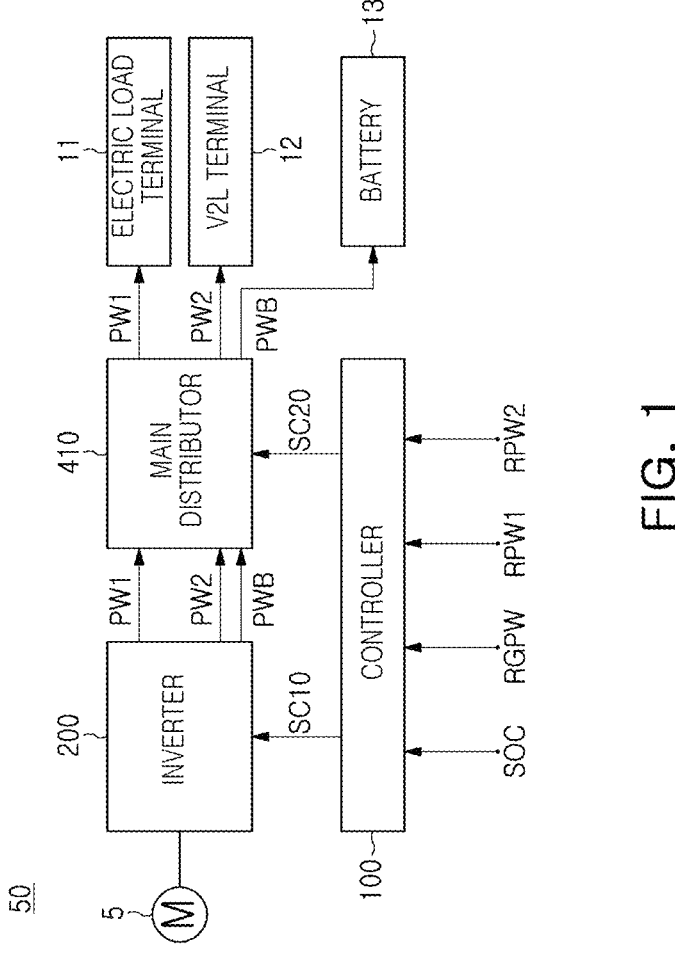
FIG. 1 is a schematic diagram of an apparatus for converting and distributing regenerative power according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, a specific embodiment of the present disclosure will be described with reference to the drawings. The following detailed description is provided to help gain a comprehensive understanding of methods, apparatuses, and/or systems described herein. However, this is only an example, and the present disclosure is not limited thereto.

In describing example embodiments of the present disclosure in detail, when it is determined that a detailed description of known technologies associated with the present disclosure may unnecessarily obscure the gist of the present disclosure, the detailed description thereof will be omitted. Furthermore, the terms described below are defined based on functions in an exemplary embodiment of the present disclosure, and may vary according to the intention or practice of a user or an operator. Therefore, the definition thereof should be based on the content throughout the present specification. The terms used in the description are intended to describe embodiments only, and shall by no means be restrictive. Unless clearly used otherwise, expressions in a singular form include a meaning of a plural form. In the present description, an expression such as "comprising" or "including" is intended to designate a characteristic, a number, a step, an operation, an element, a portion or combinations thereof, and shall not be construed to preclude any presence or possibility of one or more other characteristics, numbers, steps, operations, elements, parts or combinations thereof.

Hereinafter, example embodiments of the present disclosure will be described with reference to the accompanying drawings.

FIG. 1 is a schematic diagram of an apparatus for converting and distributing regenerative power according to an exemplary embodiment of the present disclosure.

Referring to FIG. 1, an apparatus 50 for converting and distributing regenerative power according to an exemplary embodiment of the present disclosure may include a controller 100, an inverter 200, and a main distributor 410.

The controller 100 may permit or restrict a V2L function depending on a state of charge SOC value of a battery, may compare regenerative power RGPW generated from a motor 5 according to regenerative braking with a preset electric load required power RPW1 and/or a V2L required power RPW1, and control an operation of converting the regenerative power RGPW and the distribution of the converted regenerative power according to the comparison result. For example, the controller 100 may be configured for controlling an inverter 200 and a main distributor 410 using a first control signal SC10 and a second control signal SC20. For example, the electric load required power RPW1 and the V2L required power RPW1 may be transmitted to the controller 100 from an electric load function unit and a V2L function unit.

For example, in an exemplary embodiment of the present disclosure, the controller 100 may be implemented with at least one processor to perform the functions required in an exemplary embodiment of the present disclosure.

Control operations using the first control signal SC10 and the second control signal SC20 will be described with reference to FIGS. 4 to 10.

Under the control of the controller 100, the inverter 200 may convert the regenerative power RGPW to at least one power of a first power PW1 for an electric load, a second power PW2 for a V2L terminal, and a power PWB for a battery.

For example, the regenerative power RGPW may be 10000 watts [W], the first power PW1 for the electric load may be 1200 watts [W], the second power PW2 for the V2L terminal may be 2200 watts [W], and the power PWB for the battery may be 6600 watts [W]. As an exemplary embodiment of the present disclosure, a voltage/current of the regenerative power RGPW may be alternating current (AC) 200V/50 A, a voltage/current of the first power PW1 for the electric load may be direct current (DC) 500V/2.4 A (DC), a voltage/current of the second power PW2 for the V2L terminal may be direct current (DC) 500V/4.4 A. Additionally, the voltage/current of the power PWB for the battery may be 500V/13.2 A. The above-described examples are merely examples and the present disclosure is not limited thereto.

In an exemplary embodiment of the present disclosure, the order of conversion through the inverter may be in an order of the electric load, the V2L, and the battery, and in the following description, explanations thereof proceed in order, but this is merely an example for explanation and understanding, and is not limited thereto.

Under the control of the controller 100, the main distributor 410 may distribute the first power PW1, the second power PW2, and the power PWB for the battery to an electric load terminal 11, a V2L terminal 12, and a battery 13 when the V2L function is permitted, and may distribute the first power PW1 to the electric load terminal 11 when the V2L function is restricted. Here, the electric load terminal 11 and the V2L terminal 12 may be terminals connected to the electric load function unit and the V2L function unit. Each of the electric load function unit and the V2L function unit may confirm required power and transmit the power to the controller 100.

In an exemplary embodiment of the present disclosure, regenerative braking may be a concept that includes smart regenerative braking which may obtain higher regenerative power as well as general regenerative braking.

In an exemplary embodiment of the present disclosure, the remaining power excluding the power transmitted to the electric load terminal 11 and the V2L terminal 12, among the regenerative power is transmitted to the battery 13 and stored, like an existing method, and since this is the same as the existing method, detailed description thereof is omitted in an exemplary embodiment of the present disclosure.

Typically, an electric vehicle converts the kinetic energy of the vehicle into electrical energy when decelerating while driving and applies the brakes, and the electrical energy generated at the instant time may be stored in a high-voltage battery, but a regenerative braking technology like this may be used to improve driving efficiency.

Regarding the regenerative braking technology, since the electrical energy voltage obtained through the regenerative braking is lower than a high-voltage battery voltage under normal driving conditions, the electrical energy voltage may be converted to a voltage level of a high-voltage battery through an inverter and may be stored in the battery.

For each drawing of the present disclosure, unnecessary redundant descriptions of components with the same symbols and the same function may be omitted maximally, and explanations on differences may be described for each of drawings.

Figure 2:
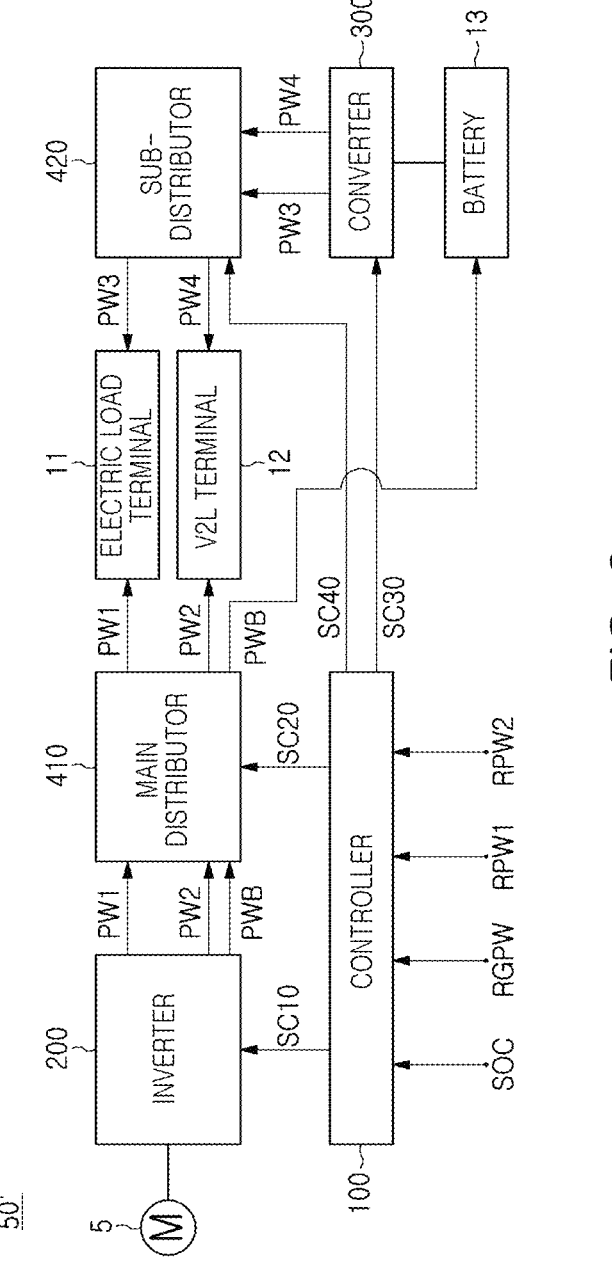
FIG. 2 is an exemplary diagram of an apparatus for converting and distributing regenerative power.

FIG. 2 is an exemplary diagram of an apparatus for converting and distributing regenerative power.

An apparatus 50' for converting and distributing regenerative power illustrated in FIG. 2 may further include a converter 300 and a sub-distributor 420 in addition to apparatus 50 for converting and distributing regenerative power illustrated in FIG. 1.

Referring to FIG. 2, the converter 300 may convert the power of the battery 13 into a third power RPW2 for an electric load or a fourth power RPW1 for a V2L terminal, under the control of the controller 100 when regenerative power RGPW is insufficient compared to a predetermined required power RPW1+RPW2 or RPW1, according to the comparison result in the controller 100. For example, the converter 300 may be a low DC converter (LDC) converting a battery voltage higher than or equal to 400V (e.g., 600V or 750V or higher) to a low voltage (e.g., 12V or 220V).

In an exemplary embodiment of the present disclosure, when an inverter is used and a converter is additionally used to provide the regenerative power to the electric load terminal and the Vehicle-To-Vehicle (V2V) terminal, because energy loss increases, the regenerative power may be provided directly to the electric load terminal and the V2V terminal through the inverter without going through the battery and converter to prevent the energy loss. Accordingly, there is an advantage in that energy loss may be prevented. However, only in cases in which the regenerative power may not cover the required power, the insufficient power may be provided using battery power using the converter.

When the regenerative power RGPW is insufficient, as compared to a predetermined required power RPW1+RPW2 or RPW1, the sub-distributor 420 may distribute the third power RPW2 to the electric load terminal 11 or the fourth power RPW1 to the V2L terminal 12 under the control of the controller 100.

Figure 3:
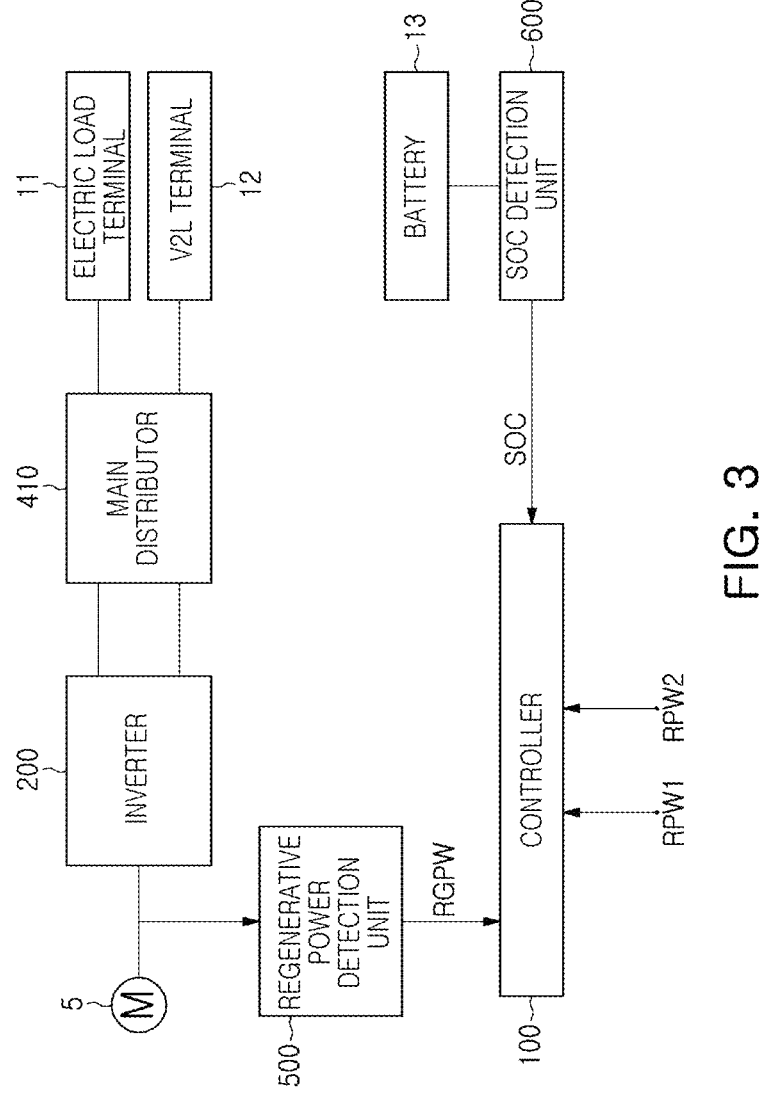
FIG. 3 is an exemplary diagram of an SOC detection unit and regenerative power detection unit.

FIG. 3 is an exemplary diagram of an SOC detection unit and regenerative power detection unit.

Referring to FIG. 3, the apparatus 50 for converting and distributing regenerative power of the vehicle of FIG. 1 or the apparatus 50' for converting and distributing regenerative power of FIG. 2 may further include regenerative power detection unit 500 and an SOC detection unit 600.

The regenerative power detection unit 500 may detect the regenerative power RGPW generated from the motor 5 during regenerative braking. For example, the voltage and current generated according to a torque of the motor 5 may be detected, and the regenerative power RGPW may be detected using the detected voltage and current. This is only an example and is not limited thereto, and at least one of various known methods for detecting the regenerative power of the motor may be applied.

The SOC detection unit 600 may detect the state of charge SOC value of the battery 13. For example, a component, a circuit, a device, or a system configured for detecting the state of charge of the battery 13 may be applied to the SOC detection unit 600. As an exemplary embodiment of the present disclosure, the SOC detection unit 600 may be an interface receiving the SOC from a battery management system (BMS).

Figure 4:
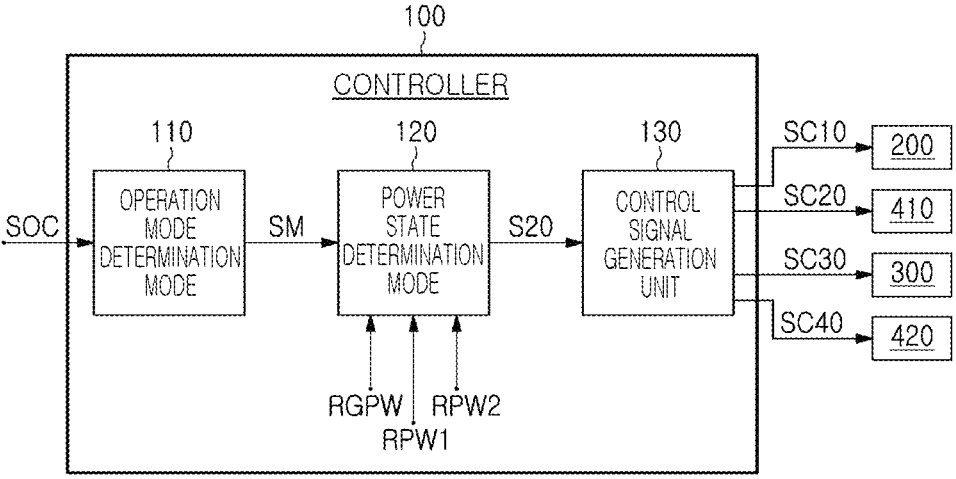
FIG. 4 is an exemplary diagram of the configuration of a controller.

FIG. 4 is an exemplary diagram of the configuration of a controller.

Referring to FIG. 4, the controller 100 may include an operation mode determination unit 110, a power state determination unit 120, and a control signal generation unit 130.

For example, the operation mode determination unit 110 may be configured to determine a first operation mode of permitting the V2L function or a second operation mode of restricting the V2L function depending on the state of charge SOC value of the battery 13 (see FIG. 3). For example, in the first operation mode, the operation mode determination unit 110 may output a mode signal SM including a high level (logic 1), and in the second operation mode, the operation mode determination unit 110 may output a mode signal SM including a low level (logic O). The operation mode determination unit 110 will be described with reference to FIG. 5.

In the first operation mode based on the mode signal (SM), the power state determination unit 120 may compare the regenerative power RGPW with the electric load required power RPW1 and the V2L required power RPW2, and may be configured to determine a power state as one of a first power state ST1, a second power state ST2, and a third power state ST3 according to the comparison result, and in the second operation mode, the power state determination unit 120 may compare the regenerative power RGPW with the electric load required power RPW1, and may be configured to determine the power state as one of a fourth power state ST4 and a fifth power state ST5 according to the comparison result. For example, the power state determination unit 120 may output a power state signal S20 for identifying a plurality of power states. As an exemplary embodiment of the present disclosure, the power state signal S21 may include a plurality of power state signals, and when a first power state signal among the plurality of power state signals is on a high level, the first power state signal may be in the first power state ST1. This example of a signal is only an example for convenience of understanding and explanation, and is not limited thereto. The power state determination unit 120 will be described with reference to FIG. 6.

The control signal generation unit 130 may be configured to generate a first control signal SC10 for controlling the inverter 200, a second control signal SC20 for controlling the main distributor 410, a third control signal SC30 for controlling the converter 300, and a fourth control signal SC40 for controlling the sub-distributor 420, according to the determination of the power state determination unit 120 based on the state signal S20. The control signal generation unit 130 will be described with reference to FIG. 7.

In an exemplary embodiment of the present disclosure, each of the operation mode determination unit 110, the power state determination unit 120 and the control signal generation unit 130 may be implemented as individual processors, or may be implemented as one processor, and is limited to any one thereof.

Additionally, each of the operation mode determination unit 110, the power state determination unit 120 and the control signal generation unit 130 may be implemented as hardware or software in at least one integrated circuit (IC) built into a battery management device, and is not particularly limited to either one.

Figure 5:
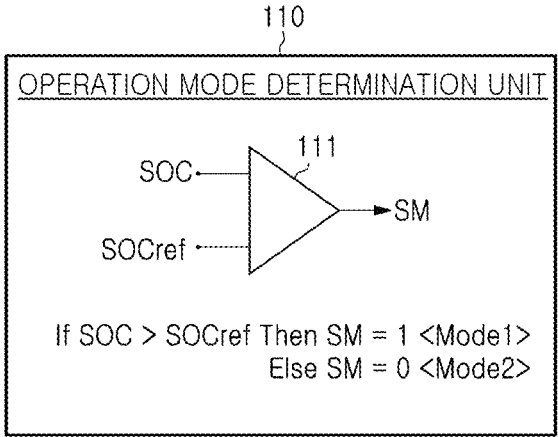
FIG. 5 is an exemplary diagram of an operation mode determination unit.

FIG. 5 is an exemplary diagram of an operation mode determination unit.

Referring to FIG. 5, for example, the operation mode determination unit 110 may include a first comparator 111.

The first comparator 111 compares a detected state of charge SOC value of the battery 13 with a reference state of charge (SOCref), and when the state of charge SOC value of the battery 13 is higher than the reference state of charge (SOCref), the first comparator 111 may output a mode signal (e.g., SM=1) determining a first operation mode Mode1 permitting the V2L function, and when the state of charge SOC value of the battery 13 is lower than the reference state of charge (SOCref), the first comparator 111 may output a mode signal (e.g., SM=0) determining a second operation mode Mode2 restricting the V2L function. For example, the reference state of charge (SOCref) may be 30%, but the present disclosure is not limited thereto.

In an exemplary embodiment of the present disclosure, each of the high level and the off level may be logic 1 or logic 0, and the high level and the low level may be voltage levels, but the present disclosure is limited thereto. In the above-described example, the case of active high was described, but this is only an example for convenience of explanation and understanding, and the present disclosure is not limited to this, and thus, the present disclosure may be applied even in a case of active low, which may also be applied to the description below.

Figure 6:
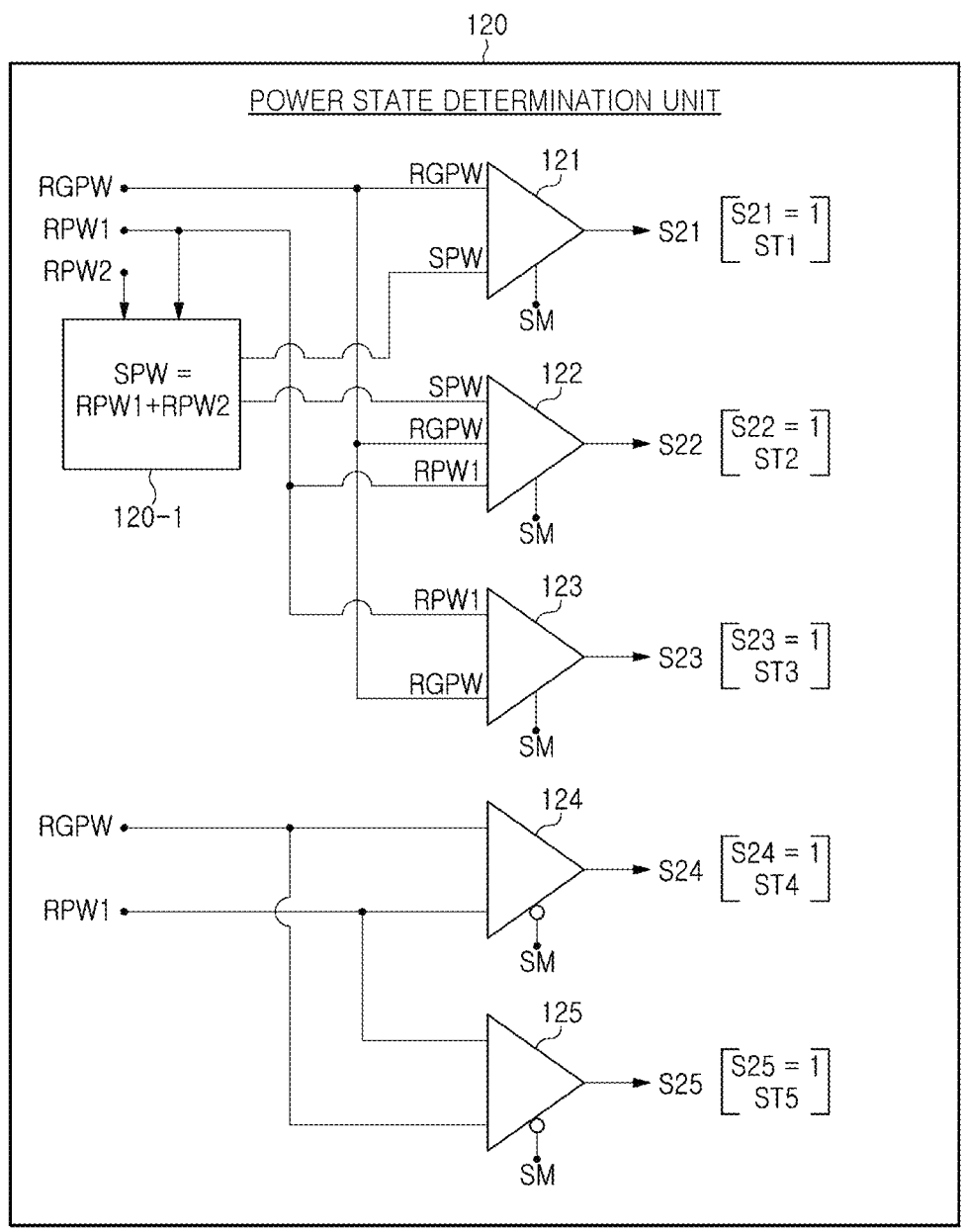
FIG. 6 is an exemplary diagram of a power state determination unit.

FIG. 6 is an exemplary diagram of a power state determination unit.

Referring to FIG. 6, the power state determination unit 120 may include an addition unit 120-1, a first determination unit 121, a second determination unit 122, a third determination unit 123, a fourth determination unit 124, and a fifth determination unit 125. For example, the first determination unit 121, the second determination unit 122 and the third determination unit 123 may operate in the first operation mode Mode1 (SM=1), and the fourth determination unit 124 and the fifth determination unit 125 may operate in the second operation mode Mode2 (SM=0).

The addition unit 120-1 may obtain a total required power SPW by adding a preset electric load required power RPW1 and a V2L required power RPW2.

In the case in which the first determination unit 121 is in the first operation mode (SM=1), a V2L function permission mode, when the regenerative power RGPW is greater than or equal to the total required power SPW, the first determination unit 121 may output a first power state signal S21 on a high level and may be configured to determine the power state as the first power state ST1.

In the case in which the second determination unit 122 is in the first operation mode (SM=1), when the regenerative power RGPW is less than the total required power SPW and is greater than or equal to the electric load required power RPW1, the second determination unit 122 may output a second power state signal S22 on a high level and determine the power state as the second power state ST2.

In the case in which the third determination unit 123 is in the first operation mode (SM=1), when the regenerative power RGPW is less than the electric load required power RPW1, the third determination unit 123 may output a third power state signal S23 on a high level and may be configured to determine the power state as the third power state ST3.

In the case in which the fourth determination unit 124 is in the second operation mode (SM=0), when the regenerative power RGPW is greater than or equal to the electric load required power RPW1, the fourth determination unit 124 may output a fourth power state signal S24 on a high level and may be configured to determine the power state as the fourth power state ST4.

In the case in which the fifth determination unit 125 is in the second operation mode (SM=0), when the regenerative power RGPW is less than the electric load required power RPW1, the fifth determination unit 125 may output a fifth power state signal S25 on a high level and may be configured to determine the power state as the fifth power state ST5.

Figure 7:
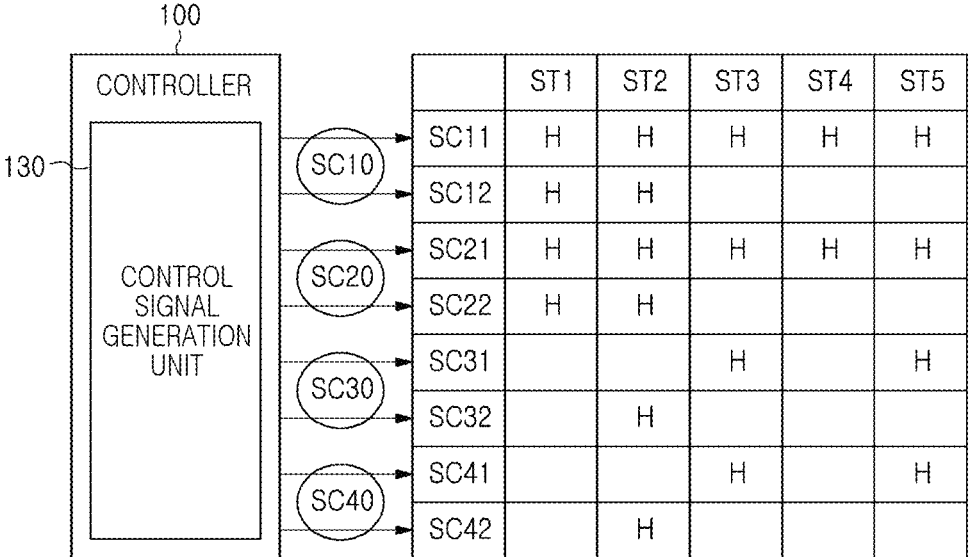
FIG. 7 is an exemplary diagram of a control signal generation unit.

FIG. 7 is an exemplary diagram of a control signal generation unit.

The control signal generation unit 130 may be configured to generate control signals according to each of the first power state ST1, the second power state ST2, the third power state ST3, the fourth power state ST4 and the fifth power state ST5.

When the power state determination unit 120 determines the first power state ST1, the control signal generation unit 130 may be configured to generate a first control signal SC10 for controlling conversion of the first power PW1 and conversion of the second power PW2 of the inverter 200, and a second control signal SC20 for transmitting the first power PW1 of the inverter 200 to the terminal 11, and transmitting the second power PW2 of the inverter 200 to the V2L terminal 12.

For example, referring to FIG. 7, the first control signal SC10 may include a control signal SC11 and a control signal SC12 including a high level H, and the second control signal SC20 may include a control signal SC11 and a control signal SC22 including a high level H.

When the power state determination unit 120 determines the second power state ST2, the control signal generation unit 130 may be configured to generate a first control signal SC10 for controlling conversion of the first power PW1 and convention of the second power PW2 of the inverter 200, a second control signal SC20 for transmitting the first power PW1 of the inverter 200 to the charge load terminal 11 and transmitting the second power PW2 of the inverter 200 to the V2L terminal 12, a third control signal SC30 for controlling conversion of a fourth power PW4 of the converter 300, and a fourth control signal SC40 for transmitting the fourth power PW4 of the converter 300 to the V2L terminal 12.

For example, referring to FIG. 7, the first control signal SC10 may include a control signal SC11 and a control signal SC12 including a high level H, the second control signal SC20 may include a control signal SC21 and a control signal SC22 including a high level H, the third control signal SC30 may include a control signal SC32 including a high level H, and the fourth control signal SC40 may include a control signal SC42 including a high level H.

When the power state determination unit 120 determines the third power state ST3, the control signal generation unit 130 may be configured to generate a first control signal SC10 for controlling conversion of the first power PW1 of the inverter 200, a second control signal SC20 for transmitting the first power PW1 of the inverter 200 to the charge load terminal 11, a third control signal SC30 for controlling conversion of the third power PW3 of the converter 300, and a fourth control signal SC40 for transmitting the third power PW3 of the converter 300 to the electric load terminal 11.

For example, referring to FIG. 7, the first control signal SC10 may include a control signal SC11 including a high level H, the second control signal SC20 may include a control signal SC21 including a high level H, the third control signal SC30 may include a control signal SC31 including a high level H, and the fourth control signal SC40 may include a control signal SC41 including a high level H.

When the power state determination unit 120 determines the fourth power state ST4, the control signal generation unit 130 may be configured to generate a first control signal SC10 for controlling conversion of the first power PW1 of the inverter 200, and a second control signal SC20 for transmitting the first power PW1 of the inverter 200 to the electric load terminal 11.

For example, referring to FIG. 7, the first control signal SC10 may include a control signal SC11 including a high level H, and the second control signal SC20 may include a control signal SC21 including a high level H.

Additionally, when the power state determination unit 120 determines the fifth power state ST5, the control signal generation unit 130 may be configured to generate a first control signal SC10 for controlling conversion of the first power PW1 of the inverter 200, a second control signal SC20 for transmitting the first power PW1 of the inverter 200 to the charge load terminal 11, a third control signal SC30 for controlling conversion of the third power PW3 of the converter 300, and a fourth control signal SC40 for transmitting the third power PW3 of the converter 300 to the electric load terminal 11.

For example, referring to FIG. 7, the first control signal SC10 may include a control signal SC11 including a high level H, the second control signal SC20 may include a control signal SC21 including a high level H, the third control signal SC30 may include a control signal SC31 including a high level H, and the fourth control signal SC40 may include a control signal SC41 including a high level H.

Since the example of the controller 100 described above is merely an exemplary explanation for understanding the concept of the present disclosure and the exemplary embodiment of the present disclosure, the present disclosure is not limited thereto, and it will be understood by those skilled in the art that various embodiments of the controller 100 may be possible within the scope of the spirit and concept of the present disclosure.

Figure 8:
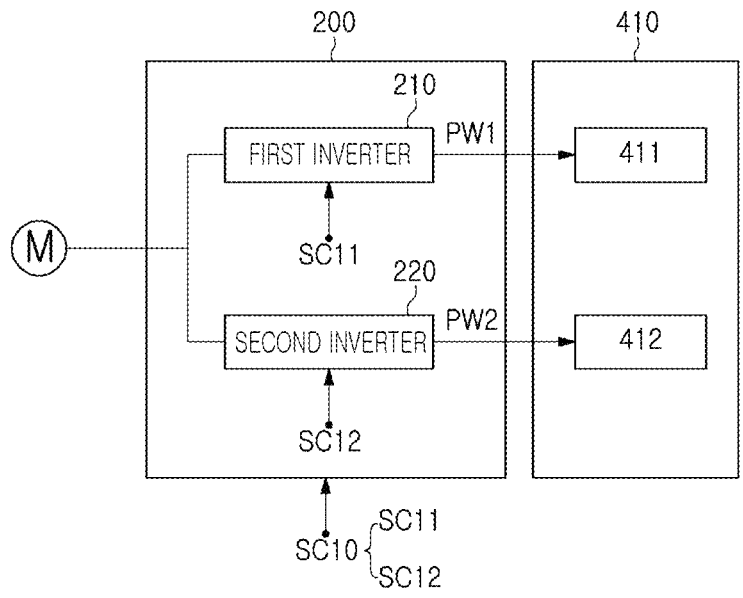
FIG. 8 is an exemplary diagram of an inverter.

FIG. 8 is an exemplary diagram of an inverter.

Referring to FIG. 8, the inverter 200 may include a first inverter 210 and a second inverter 220.

The first inverter 210 may operate under the control of the controller 100 to convert the regenerative power RGPW into the first power PW1 for the electric load. For example, the first inverter 210 may operate according to the control signal SC11 of the first control signal SC10 and may output the first power PW1 to the first distributor 411 of the main distributor 410.

The second inverter 220 may operate under the control of the controller 100 to convert the regenerative power RGPW into the second power PW2 for the V2L power. For example, the second inverter 220 may operate according to the control signal SC12 of the first control signal SC10 and may output the second power PW2 to the second distributor 412 of the main distributor 410.

Figure 9:
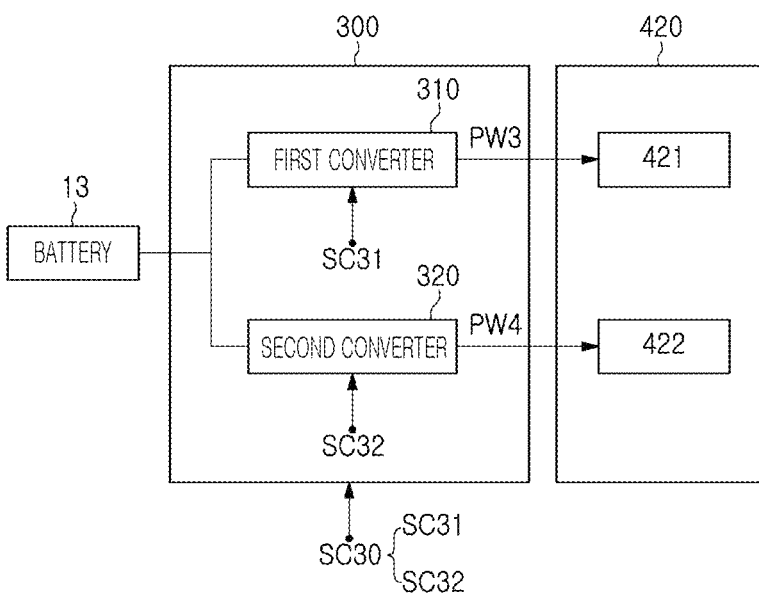
FIG. 9 is an exemplary diagram of a converter.

FIG. 9 is an exemplary diagram of a converter.

Referring to FIG. 9, the converter 300 may include a first converter 310 and a second converter 320.

The first converter 310 may operate under the control of the controller 100 to convert the power of the battery 13 into the third power PW3 for the electric load. For example, the first converter 310 may operate according to the control signal SC31 including a high level included in the third control signal SC30 to output the third power PW3 to a third distributor 421 of the sub-distributor 420.

The second converter 320 may operate under the control of the controller 100 to convert the power of the battery 13 into the fourth power PW4 for the V2L power. For example, the second converter 320 may operate according to the control signal SC32 including a high level included in the third control signal SC30 to output the fourth power PW4 to a fourth distributor 422 of the sub-distributor 420.

Figure 10:
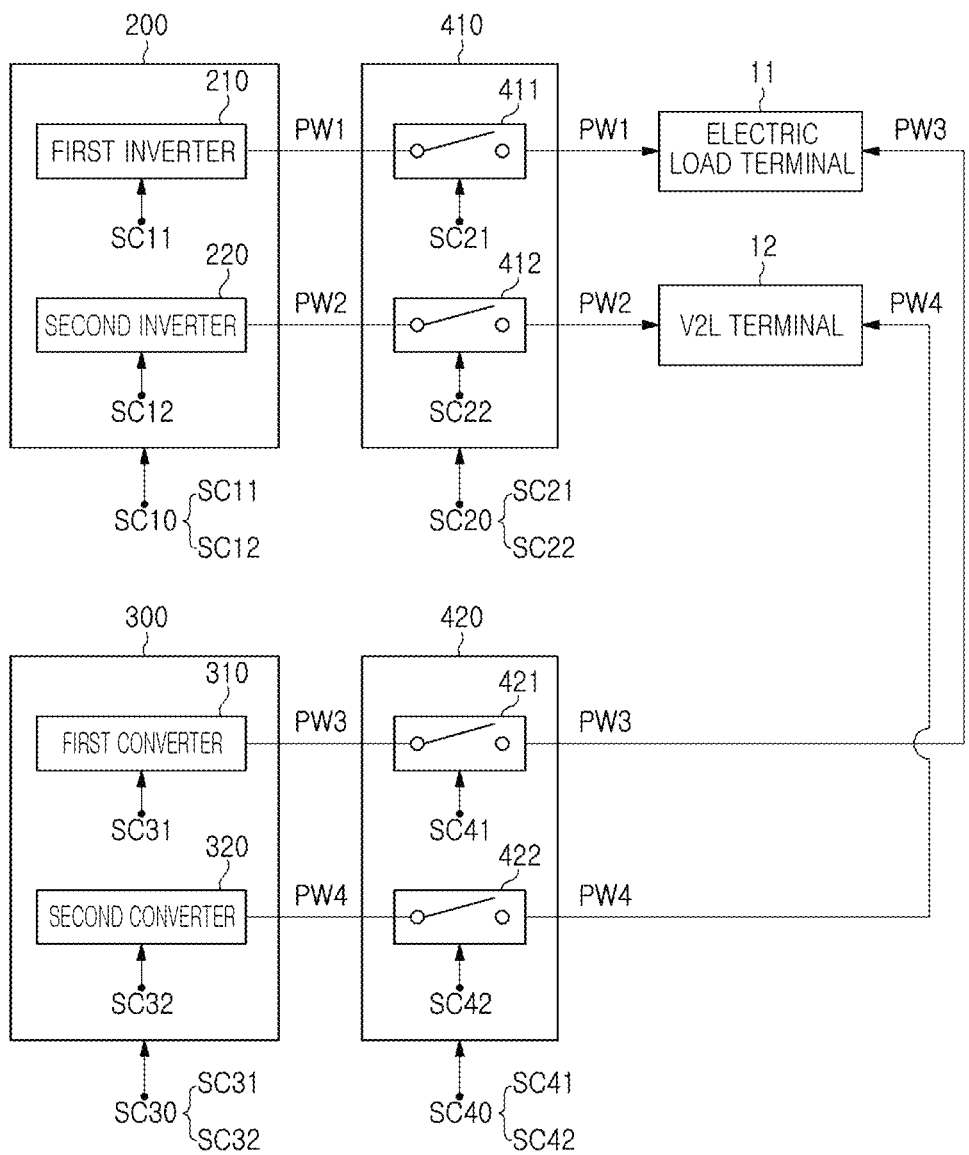
FIG. 10 is an exemplary diagram of a main distributor and a sub-distributor.

FIG. 10 is an exemplary diagram of a main distributor and a sub-distributor.

Referring to FIG. 10, the main distributor 410 may include a first distributor 411 and a second distributor 412 to distribute the first power PW1 and the second power PW2 based on the regenerative power RGPW directly to the charge load terminal 11 and/or the V2L terminal 12, without going through the battery 13, The first distributor 411 may transmit the first power PW1 of the first inverter 210 to the charge load terminal 11 under the control of the controller 100. For example, the first distributor 411 may operate according to the control signal SC21 including a high level included in the second control signal SC20 to transmit the first power PW1 received from the first inverter 210 to the electric load terminal 11.

The second distributor 412 may transmit the second power PW2 of the second inverter 220 to the V2L terminal 12 under the control of the controller 100. For example, the second distributor 412 may operate according to the control signal SC22 including a high level included in the second control signal SC20 to transmit the second power PW2 received from the second inverter 210 to the V2L terminal 12.

Additionally, the sub-distributor 420 may include a third distributor 421 and a fourth distributor 422 to distribute the third power PW3 and the fourth power PW4 based on the power of the battery to the charge load terminal 11 and/or the V2L terminal 12 when the regenerative power RGPW is insufficient.

The third distributor 421 may transmit the third power PW3 of the first converter 310 to the electric load terminal 11 under the control of the controller 100. For example, the third distributor 421 may operate according to the control signal SC41 including a high level included in the fourth control signal SC40 to transmit the third power PW3 received from the first converter 310 to the electric load terminal 11.

The fourth distributor 422 may transmit the fourth power PW4 of the second converter 320 to the V2L terminal 12 under the control of the controller 100. For example, the fourth distributor 422 may operate according to the control signal SC42 including a high level included in the fourth control signal SC40 to transmit the fourth power PW4 received from the second converter 320 to the electric load terminal 12.

Next, with reference to FIGS. 11 to 19, a method for converting and distributing the regenerative power will be described. In an exemplary embodiment of the present disclosure, a description of the method for converting and distributing the regenerative power and a description of the apparatus for converting and distributing the regenerative power may complement each other or be applied in common, unless there are mutually exclusive circumstances. Accordingly, overlapping descriptions will be omitted whenever possible.

Figure 11:
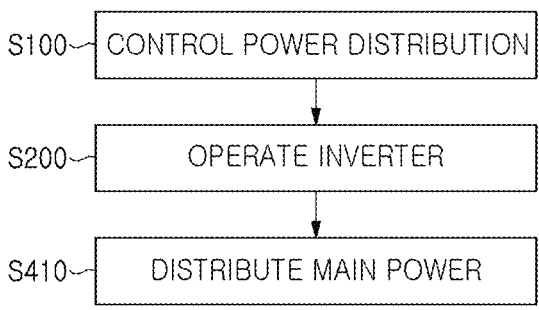
FIG. 11 is an operation flowchart of a method for converting and distributing regenerative power according to an exemplary embodiment of the present disclosure.

FIG. 11 is an operation flowchart of a method for converting and distributing regenerative power according to an exemplary embodiment of the present disclosure.

Referring to FIG. 11, the method for converting and distributing the regenerative power conversion and distribution according to an exemplary embodiment of the present disclosure may be applied to the apparatus for converting and distributing the regenerative power (50 in FIG. 1 or 50' in FIG. 2) (hereinafter, 50'), and the method therefor may include a power distribution control operation (S100), an inverter operating operation (S200), and a main power distribution operation (S410).

In the power distribution control operation (S100), the controller 100 of the apparatus 50' for converting and distributing the regenerative power may permit or restrict the V2L function depending on the state of charge (SOC) value of the battery 13, may compare the regenerative power RGPW generated from the motor 5 according to regenerative braking with a preset electric load required power RPW1 and/or a preset V2L required power RPW1, and may be configured for controlling an operation of converting the regenerative power RGPW and the distribution of the converted regenerative power according to the comparison result. For example, when the V2L function is permitted, the regenerative power RGPW may be compared with the electric load required power RPW1, and the V2L required power RPW1, and when the V2L function is restricted, the regenerative power RGPW may be compared with the electric load required power RPW1.

In the inverter operating operation (S200), the inverter 200 of the apparatus 50' for converting and distributing the regenerative power may convert the regenerative power RGPW into at least one power of the first power PW1 for the electric load, the second power PW2 for the V2L terminal, and the power PWB for the battery, under the control of the controller 100. For example, when the regenerative power RGPW is greater than a total power of the electric load required power RPW1 and the V2L required power RPW1, the regenerative power RGPW may be converted into the first power PW1, the second power PW2, and the power PWB for the battery by the inverter 200, respectively, and on the other hand, when the regenerative power RGPW is less than the electric load required power RPW1, the regenerative power RGPW may be converted only into the first power PW1 by the inverter 200.

In the main power distribution operation (S410), under the control of the controller 100, the main distributor 410 of the apparatus 50' for converting and distributing the regenerative power may distribute the first power PW1, the second power PW2 and the power PWB for the battery to the electric load terminal 11, the V2L terminal 12, and the battery 13 when the V2L function is permitted, and may distribute the first power PW1 only to the electric load terminal 11 when the V2L function is restricted.

Figure 12:
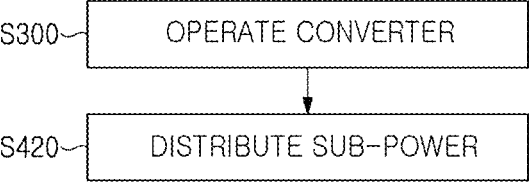
FIG. 12 is an exemplary diagram of a converter operation and a sub-power distribution operation.

FIG. 12 is an exemplary diagram of a converter operation and a sub-power distribution operation Referring to FIG. 12, the method for converting and distributing the regenerative power may include a converter operating operation (S300) and a sub-power distribution operation (S420).

In the converter operating operation (S300), the converter 300 of the apparatus 50' for converting and distributing the regenerative power may convert the power of the battery 13 into the third power RPW2 for the electronic load or the fourth power RPW1 for the V2L terminal under the control of the controller 100 when the regenerative power RGPW is insufficient, as compared to a predetermined required power RPW1+RPW2 or RPW1, according to the comparison result in the power distribution control operation (S100).

In the sub-power distribution operation (S420), the sub-distributor 420 of the apparatus 50' for converting and distributing the regenerative power may distribute the third power RPW2 to the electric load terminal 11 or distribute the fourth power RPW1 to the V2L terminal 12 under the control of the controller 100 when the regenerative power RGPW is insufficient.

Figure 13:
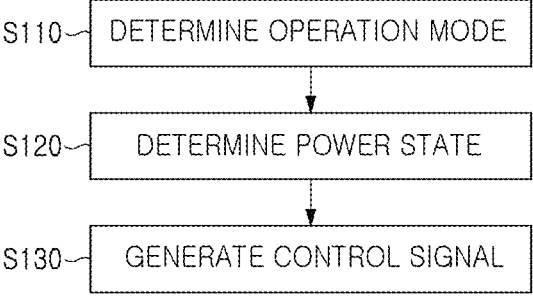
FIG. 13 is an exemplary diagram of a power distribution control operation.

FIG. 13 is an exemplary diagram of a power distribution control operation.

Referring to FIG. 13, the power distribution control operation (S100) may include an operation mode determination operation (S110), a power state determination operation (S120), and a control signal generation operation (S130).

In the operation mode determination operation (S110), the controller 100 of the apparatus 50' for converting and distributing and regenerative power may be configured to determine a first operation mode of permitting the V2L function or a second operation mode of restricting the V2L function depending on the state of charge (SOC) value of the battery 13. This will be described with reference to FIG. 14.

In the power state determination operation (S120), the controller 100 of the apparatus 50' for converting and distributing the regenerative power may be configured to determine a power state as one of the first power state ST1, the second power state ST2, and the third power state ST3 according to the comparison result, by comparing the regenerative power RGPW with the electric load required power RPW1 and the V2L required power RPW2, in the first operation mode, and may be configured to determine the power state as one of the fourth power state ST4 or the fifth power state ST5 depending on the comparison result, by comparing the regenerative power RGPW and the electric load required power RPW1, in the second operation mode. This will be described with reference to FIG. 15.

In the control signal generation operation (S130), the controller 100 of the apparatus 50' for converting and distributing the regenerative power may be configured to generate a first control signal SC10 for controlling the inverter 200, a second control signal SC20 for controlling the main distributor 410, a third control signal SC30 for controlling the converter 300, and a fourth control signal SC40 for controlling the sub-distributor 420, according to the determination of the power state determination unit 120. This will be described width reference to FIG. 16.

Figure 14:
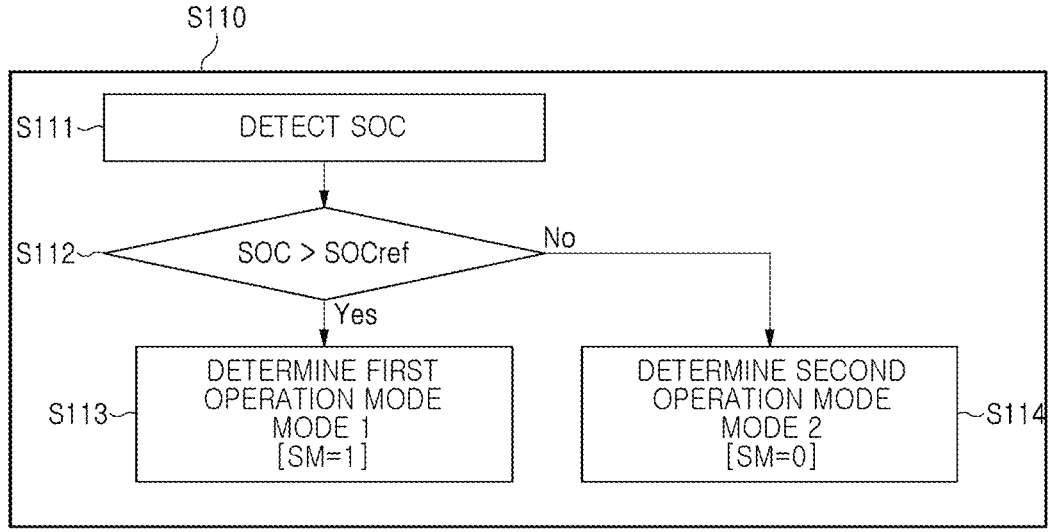
FIG. 14 is an exemplary diagram illustrating an operation mode determination operation.

FIG. 14 is an exemplary diagram illustrating an operation mode determination operation.

Referring to FIG. 14, in the operation mode determination operation (S110), the controller 100 of the apparatus 50' for converting and distributing the regenerative power may compare the detected state of charge (SOC) value of the battery 13 (S111) with the reference state of charge (SOCref) (S112), and may output a mode signal (e.g., SM=1) for determining an operation mode as the first operation mode Mode1 of permitting the V2L function when the state of charge (SOC) value of the battery 13 is greater than or equal to the reference state of charge (SOCref) (S113), and may output a mode signal (e.g., SM=0) for determining an operation mode as the second operation mode Mode2 of restricting the V2L function when the state of charge (SOC) value of the battery 13 is less than the reference state of charge (SOCref) (S114).

Figure 15:
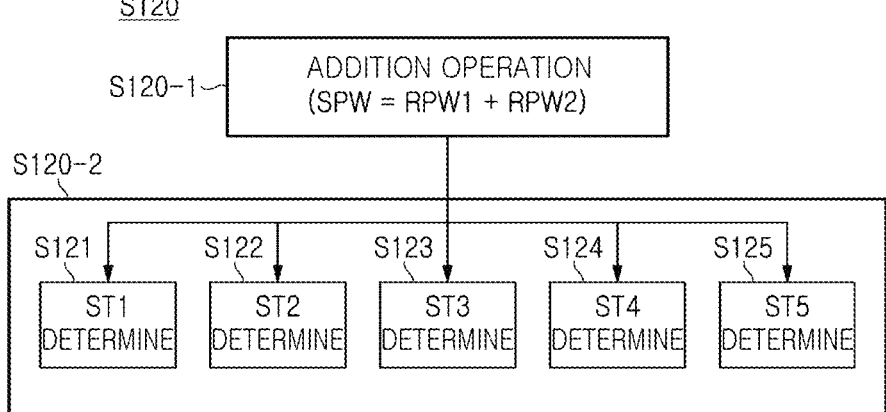
FIG. 15 is an exemplary diagram illustrating a power state determination operation.

FIG. 15 is an exemplary diagram illustrating a power state determination operation.

Referring to FIG. 15, the power state determination operation (S120) may include an addition operation (S120-1) and a power state determination operation (S120-2).

In the addition operation (S120-1), the controller 100 of the apparatus 50' for converting and distributing the regenerative power may obtain a total required power SPW by adding the electric load required power RPW1 and the V2L required power RPW2.

In the power state determination operation (S120-2), the controller 100 of the apparatus 50' for converting and distributing the regenerative power may be configured to determine a power state of the regenerative power RGPW by comparing the regenerative power RGPW with at least one of the total required power SPW, the electric load required power RPW1, and the V2L required power RPW2, in the first operation mode Mode1 or the second operation mode Mode2.

In the power state determination operation (S120-2), in the case of the first operation mode (SM=1), which is a mode of permitting the V2L function, the controller 100 of the apparatus 50' for converting and distributing the regenerative power may be configured to determine the power state as the first power state ST1 when the regenerative power RGPW is greater than or equal to the total required power SPW (S121), may be configured to determine a power state the second power state ST2 when the regenerative power RGPW is less than the total required power SPW and is greater than or equal to the electric load required power RPW1 (S122), and may be configured to determine the power state as the third power state ST3 when the regenerative power RGPW is less than the electric load required power RPW1 (S123), and in the case of the second operation mode (SM=0), the controller 100 may be configured to determine the power state as the fourth power state ST4 when the regenerative power RGPW is greater than or equal to the electric load required power RPW1 (S124), and may be configured to determine the power state as the fifth power state ST5 when the regenerative power RGPW is less than the electric load required power RPW1 (S125).

Figure 16:
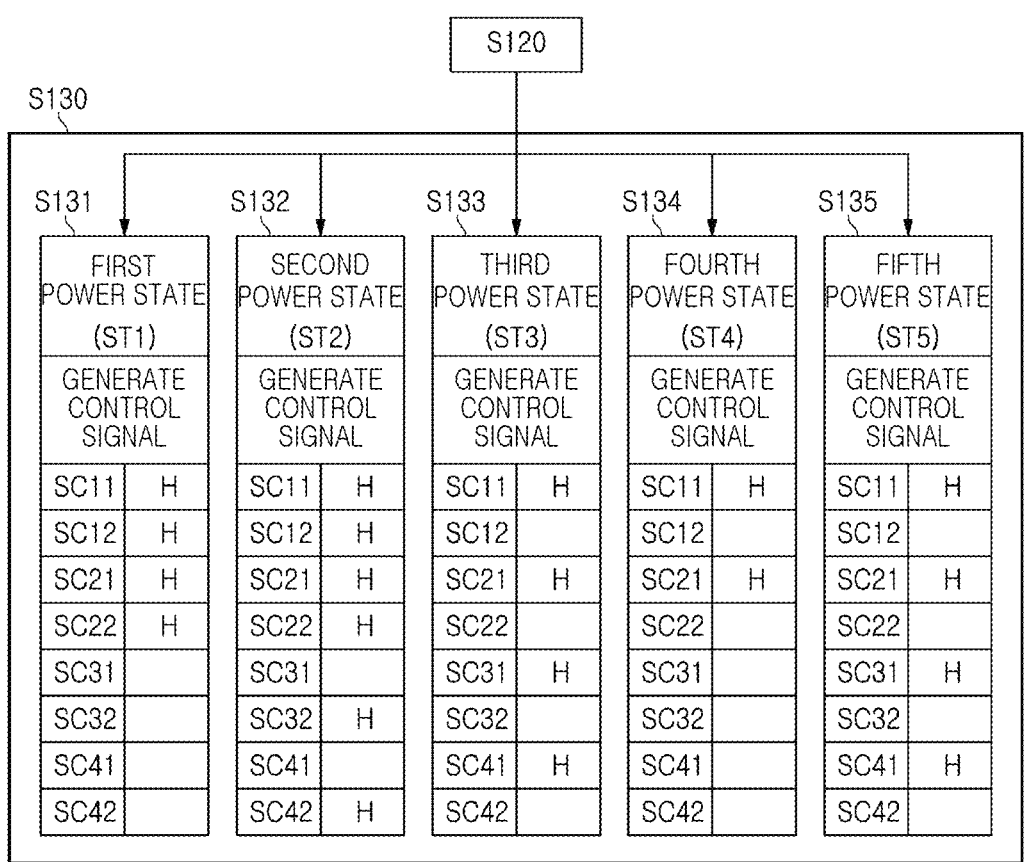
FIG. 16 is an exemplary diagram illustrating a control signal generation operation.

FIG. 16 is an exemplary diagram illustrating a control signal generation operation.

Referring to FIG. 16, in a control signal generation operation (S130), when the power state is determined as the first power state ST1 in the power state determination step (S120), the controller 100 of the apparatus 50' for converting and distributing the regenerative power may be configured to generate a first control signal SC10 for controlling conversion of the first power PW1 and the second power PW2 of the inverter 200, and a second control signal SC20 for transmitting the first power PW1 of the inverter 200 to the charge load terminal 11 and transmitting the second power PW2 of the inverter 200 to the V2L terminal 12 (S131).

In the control signal generation operation (S130), when the power state is determined as the second power state ST2 in the power state determination operation (S120), the controller 100 of the apparatus 50' of converting and distributing the regenerative power may be configured to generate a first control signal SC10 for controlling conversion of the first power PW1 and conversion of the second power PW2 of the inverter 200, a second control signal SC20 for transmitting the first power PW1 of the inverter 200 to the charge load terminal 11 and transmitting the second power PW2 of the inverter 200 to the V2L terminal 12, a third control signal SC30 for controlling conversion of the fourth power PW4 of the converter 300, and a fourth control signal SC40 for transmitting the fourth power PW4 of the converter 300 to the V2L terminal 12 (S132).

In the control signal generation operation (S130), when the power state is determined as the third power state ST3 in the power state determination unit 120, the controller 100 of the apparatus 50' for converting and distributing the regenerative power may be configured to generate a first control signal SC10 for controlling conversion of the first power PW1 of the inverter 200, a second control signal SC20 for transmitting the first power PW1 of the inverter 200 to the charge load terminal 11, a third control signal SC30 for controlling conversion of the third power PW3 of the converter 300, and a fourth control signal SC40 for transmitting the third power PW3 of the converter 300 to the electric load terminal 11 (S133).

In the control signal generation operation (S130), when the power state is determined as the fourth power state ST4 in the power state determination unit 120, the controller 100 of the apparatus 50' for converting and distributing the regenerative power may be configured to generate a first control signal SC10 for controlling conversion of the first power PW1 of the inverter 200, and a second control signal SC20 for transmitting the first power PW1 of the inverter 200 to the electric load terminal 11 (S134).

In the control signal generation operation (S130), when the power state is determined as the fifth power state ST5 in the power state determination unit 120, the controller 100 of the apparatus 50' for converting and distributing the regenerative power may be configured to generate a first control signal SC10 for controlling conversion of the first power PW1 of the inverter 200, a second control signal SC20 for transmitting the first power PW1 of the inverter 200 to the charge load terminal 11, a third control signal SC30 for controlling conversion of the third power PW3 of the converter 300, and a fourth control signal SC40 for transmitting the third power PW3 of the converter 300 to the electric load terminal 11 (S135).

Figure 17:
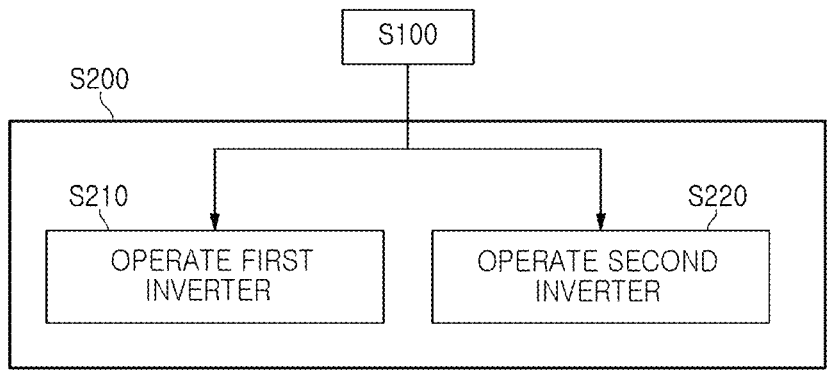
FIG. 17 is an exemplary diagram of an inverter operating operation.

FIG. 17 is an exemplary diagram of an inverter operating operation.

Referring to FIG. 17, the inverter operating operation (S200) may include a first inverter operating operation (S210) and a second inverter operating operation (S220).

In the first inverter operating operation (S210), the inverter 200 of the apparatus 50' for converting and distributing the regenerative power may operate under the control of the controller 100 to convert the regenerative power RGPW into the first power PW1 for the electric load.

In the second inverter operating operation (S220), the inverter 200 of the apparatus 50' for converting and distributing the regenerative power may operate under the control of the controller 100 to convert the regenerative power RGPW into the second power PW2 for the V2L power.

Figure 18:
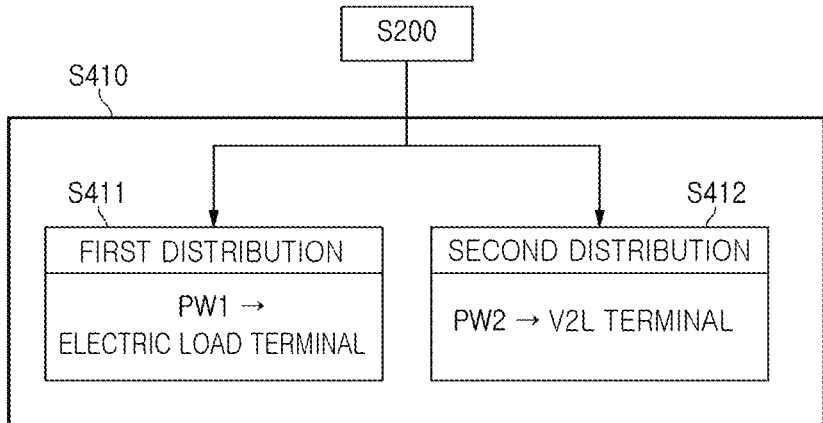
FIG. 18 is an exemplary diagram of a main power distribution operation.

FIG. 18 is an exemplary diagram of a main power distribution operation.

Referring to FIG. 18, the main power distribution operation (S410) may include a first distribution operation (S411) and a second distribution operation (S412) to distribute the first power PW1 and the second power PW2 from the inverter 200 to the electric load terminal 11 or the V2L terminal 12.

In the first distribution operation (S411), the main distributor 410 of the apparatus 50' for converting and distributing the regenerative power may transmit the first power PW1 of the first inverter 210 to the charge load terminal 11 under the control of the controller 100.

In the second distribution operation (S412), the main distributor 410 of the apparatus 50' for converting and distributing the regenerative power may transmit the second power PW2 of the second inverter 220 to the V2L terminal 12 under the control of the controller 100.

Figure 19:
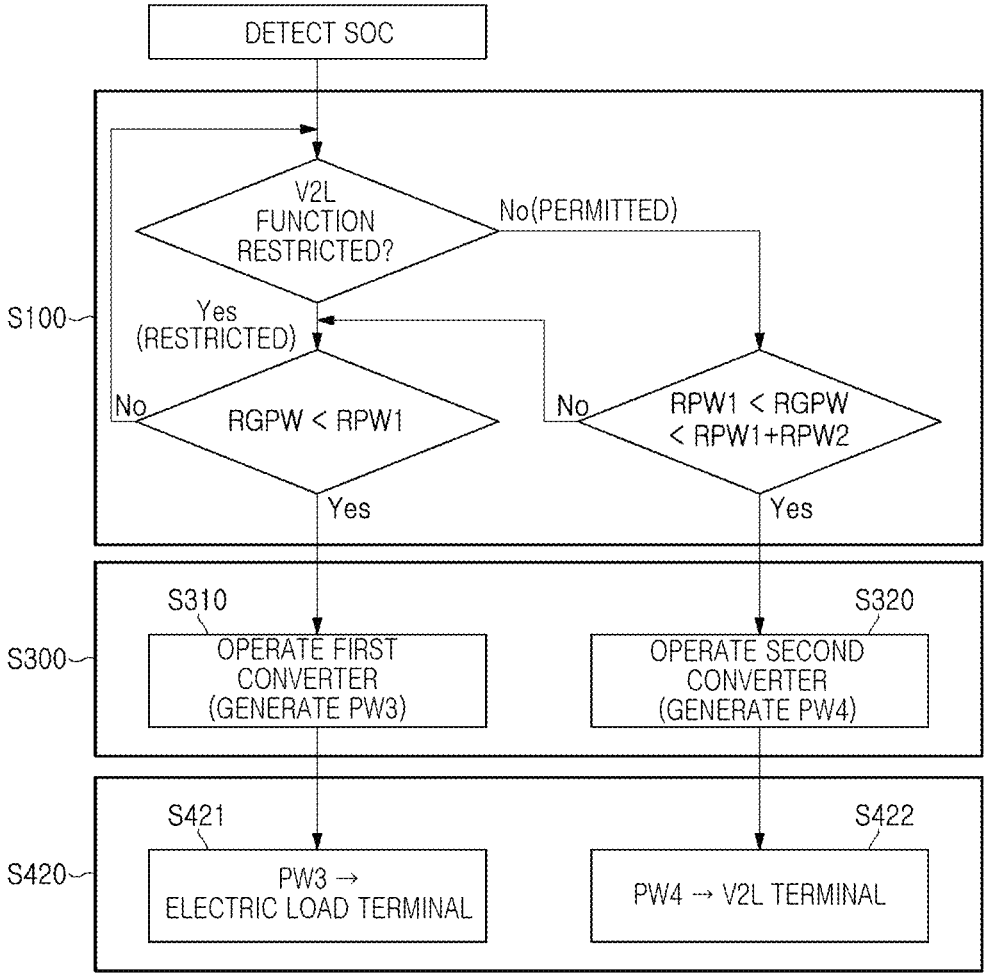
FIG. 19 is an exemplary diagram of a converter operation and a sub-power distribution operation.

FIG. 19 is an exemplary diagram of a converter operation and a sub-power distribution operation.

Referring to FIG. 19, the converter operating operation (S300) include a first converter operating operation (S310) and a second converter operation relationship (S320) to convert the regenerative power RGPW into the third power PW3 or the fourth power PW4 through the converter when the regenerative power falls short of a specified required power, for each of the V2L function restriction and the V2L function permission.

In the first converter operating operation (S310), the converter 300 of the apparatus 50' for converting and distributing the regenerative power may convert the power of the battery 13 into the third power PW3 for the electric load under the control of the controller 100 when the regenerative power RGPW is insufficient, as compared to the electric load required power RPW1. For example, the first converter operating operation (S310) may proceed when the regenerative power RGPW falls short of the electric load required power RPW1, in each of the first operation mode of permitting the V2L function or the second operation mode of restricting the V2L function.

In the second converter operating operation (S320), in the first operation mode of permitting the V2L function, the converter 300 of the apparatus 50' for converting and distributing the regenerative power may convert the power of the battery 13 into the fourth power PW4 for the V2L power under the control of the controller 100 when regenerative power RGPW is insufficient, as compared to the total required power SPW obtained by adding the electric load required power RPW1 and the V2L required power RPW2 and exceeds the electric load required power RPW1.

Furthermore, referring to FIG. 19, the sub-power distribution operation (S420) may include a third distribution operation (S421) and a fourth distribution operation (S422) to distribute the third power PW3 or the fourth power PW4 from the converter 300 to the electric load terminal 11 or the V2L terminal 12.

In the third distribution operation (S421), the sub-distributor 420 of the apparatus for converting and distributing the regenerative power 50' may transmit the third power PW3 of the first converter 310 to the electric load terminal 11 under the control of the controller 100.

In the fourth distribution operation (S422), the sub-distributor 420 of the apparatus 50' for converting and distributing the regenerative power may transmit the fourth power PW4 of the second converter 320 to the V2L terminal 12 under the control of the controller 100.

Figure 20:
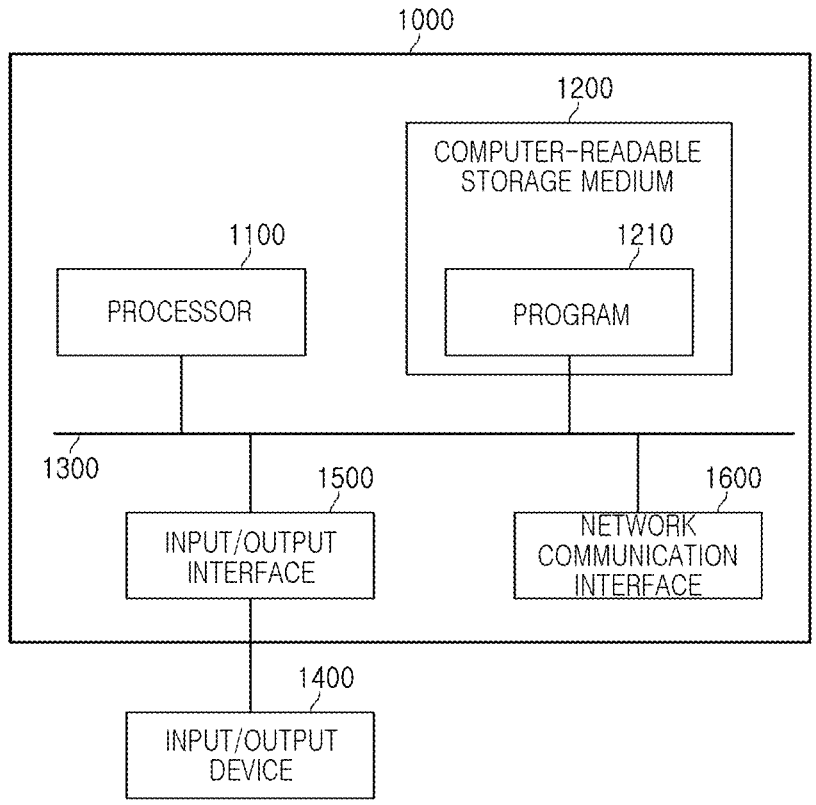
FIG. 20 is a block diagram of a computing device 1000 configured for entirely or partially implementing an apparatus and a method for converting and distributing regenerative power according to an exemplary embodiment of the present disclosure.

FIG. 20 is a block diagram of a computing device 1000 configured for entirely or partially implementing an apparatus and a method for converting and distributing regenerative power according to an exemplary embodiment of the present disclosure.

A processor 1100 may enable the computing device 1000 to operate according to the above-mentioned example embodiments. For example, the processor 1100 may execute one or more programs stored in a computer-readable non-transitory storage medium 1200. The one or more programs may include one or more computer executable instructions, and when executed by the processor 1100, the computer-executable instructions may be configured to cause the computing device 1000 to perform operations according to example embodiments.

The computer-readable storage medium 1200 is configured to store computer-executable instructions or a program code, program data, and/or other suitable forms of information. The program 1210 stored in the computer-readable storage medium 1200 may include a set of instructions executable by the processor 1100. In an exemplary embodiment of the present disclosure, the computer-readable storage medium 1200 may be a memory (e.g., a volatile memory such as a random access memory, a non-volatile memory, or an appropriate combination thereof), one or more magnetic disk storage devices, optical disk storage devices, flash memory devices, another form of storage medium configured for being accessed by the computing device 1000 and storing desired information, or a suitable combination thereof.

The communication bus 1300 interconnects various other components of computing device 1000, including the processor 1100 and the computer-readable storage medium 1200.

The computing device 1000 may also include one or more input/output interfaces 1500 and one or more network communication interfaces 1600 which provide an interface for one or more input/output devices 1400. The input/output interface 1500 and the network communication interface 1600 are connected to the communication bus 1300. The network may be a cellular network, such as Global System for Mobile Communications (GSM), Enhanced Data Rates for GSM Evolution (EDGE), General Packet Radio Service (GPRS), Code Division Multiple Access (CDMA), Time Division-CDMA (TD-CDMA), Universal Mobile Telecommunications System (UMTS), Long Term Evolution (LTE), or any other cellular network.

The input/output device 1400 may be connected to other components of the computing device 1000 through the input/output interface 1500. The exemplary input/output device 1400 may include input devices such a pointing device (e.g., a mouse, a trackpad or the like), a keyboard, a touch input device (e.g., a touchpad, a touch screen or the like), a voice or sound input device, various types of sensor devices and/or capturing devices, and/or output devices such as a display device, a printer, a speaker, and/or a network card. The exemplary input/output device 1400 may be a component included in the computing device 1000 and may be included in the computing device 1000, and may be a separate device which is distinct from the computing device 1000 and may be connected to the computing device 1000.

Meanwhile, various exemplary embodiments of the present disclosure may include a program for performing the methods described in the present specification on a computer, and a computer-readable recording medium including the program. The computer-readable recording medium may include program instructions, local data files and local data structures along or in a combination of two or more thereof. The media may be those specifically designed and constructed for the present disclosure, or may be those commonly available in the computer software field. Examples of computer-readable recording media include magnetic media such as hard disks, floppy disks and magnetic tapes, optical recording media such as CD-ROM and DVD, and hardware devices specifically configured to store and execute program instructions, such as ROM, RAM, flash memory, and the like. Examples of the programs may include not only machine language code such as that generated by a compiler, but also high-level language code which may be executed by a computer using an interpreter or the like.

The control device may be at least one microprocessor operated by a predetermined program which may include a series of commands for carrying out the method included in the aforementioned various exemplary embodiments of the present disclosure.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Software implementations may include software components (or elements), object-oriented software components, class components, task components, processes, functions, attributes, procedures, subroutines, program code segments, drivers, firmware, microcode, data, database, data structures, tables, arrays, and variables. The software, data, and the like may be stored in memory and executed by a processor. The memory or processor may employ a variety of means well known to a person including ordinary knowledge in the art.

Furthermore, the terms such as "unit", "module", etc. included in the specification mean units for processing at least one function or operation, which may be implemented by hardware, software, or a combination thereof.

In the flowchart described with reference to the drawings, the flowchart may be performed by the controller or the processor. The order of operations in the flowchart may be changed, a plurality of operations may be merged, or any operation may be divided, and a predetermined operation may not be performed. Furthermore, the operations in the flowchart may be performed sequentially, but not necessarily performed sequentially. For example, the order of the operations may be changed, and at least two operations may be performed in parallel.

Hereinafter, the fact that pieces of hardware are coupled operatively may include the fact that a direct and/or indirect connection between the pieces of hardware is established by wired and/or wirelessly.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the present specification, unless stated otherwise, a singular expression includes a plural expression unless the context clearly indicates otherwise.

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An apparatus for converting and distributing regenerative power from a vehicle, the apparatus comprising:
   a controller configured to permit or restrict a Vehicle To Load (V2L) function between the vehicle and a load depending on a state of charge (SOC) value of a battery, compare an amount of regenerative power generated from a motor according to regenerative braking with a preset electric load required power amount of the vehicle or a V2L required power amount of the load, and control an operation of converting the regenerative power according to a comparison result and distribution of the converted regenerative power;
   an inverter operatively connected to the controller and configured to convert the regenerative power into at least one power of a first power for an electric load, a second power for a V2L terminal, and power of the battery, under the control of the controller; and
   a main distributor circuit operatively connected to the controller and configured to distribute the first power, the second power, and the power of the battery to an electric load terminal, the V2L terminal, and the battery in response that the V2L function is permitted, and distribute the first power to the electric load terminal in response that the V2L function is restricted, under the control of the controller.

2. The apparatus of claim 1, further including:
   a converter operatively connected to the controller and configured to convert the power of the battery into a third power for an electric load or a fourth power for the V2L terminal under the control of the controller in response that the regenerative power is insufficient, as compared to a predetermined required power, according to the comparison result in the controller; and
   a sub-distributor operatively connected to the controller and configured to distribute the third power to the electric load terminal or distribute the fourth power to the V2L terminal, under the control of the controller, in response that the regenerative power is insufficient, as compared to the predetermined required power.

3. The apparatus of claim 1, further including:
   a regenerative power detection unit operatively connected to the controller and configured to detect the regenerative power generated from the motor; and
   an SOC detection unit operatively connected to the controller and configured to detect the state of charge of the battery.

4. The apparatus of claim 2, wherein the controller includes:
   an operation mode determination unit configured to determine a first operation mode of permitting the V2L function or a second operation mode of restricting the V2L function depending on the state of charge of the battery;
   a power state determination unit configured to determine a power state as one of a first power state, a second power state, and a third power state by comparing the amount of the regenerative power, the electric load required power amount, and the V2L required power amount in the first operation mode, and determine a power state as one of a fourth power state and a fifth power state by comparing the amount of the regenerative power and the electric load required power amount in the second operation mode; and
   a control signal generation unit configured to generate a first control signal for controlling the inverter, a second control signal for controlling the main distributor, a third control signal for controlling the converter, and a fourth control signal for controlling the sub-distributor, according to determination of the power state determination unit.

5. The apparatus of claim 4, wherein the operation mode determination unit includes:
   a first comparator configured to compare the state of charge and a reference state of charge, and output a mode signal for determining a first operation mode of permitting the V2L function in response that the state of charge is greater than or equal to the reference state of charge, and output a mode signal for determining a second operation mode of restricting the V2L function in response that the state of charge is less than the reference state of charge.

6. The apparatus of claim 4, wherein the power state determination unit includes:

an addition unit configured to obtain a total required power by adding the preset electric load required power amount and the V2L required power amount;

a first determination unit configured to, in a case of the first operation mode, which is a mode of permitting the V2L function, determine the power state as the first power state in response that the regenerative power is greater than or equal to the total required power;

a second determination unit configured to determine the power state as the second power state in response that the regenerative power is lower than the total required power and is greater than or equal to the electric load required power amount;

a third determination unit configured to determine the power state as the third power state in response that the regenerative power is lower than the electric load required power amount;

a fourth determination unit configured to, in a case of the second operation mode, determine the power state as the fourth power state in response that the regenerative power is greater than or equal to the electric load required power; and a fifth determination unit configured to, in a case of the second operation mode, determine the power state as the fifth power state in response that the regenerative power is lower than the electric load required power amount.

7. The apparatus of claim 6, wherein the control signal generation unit is configured to, in response that the power state is determined as the first power state in the power state determination unit, generate a first control signal for controlling first power conversion and second power conversion of the inverter, and a second control signal for transmitting the first power of the inverter to a charge load terminal and transmitting the second power of the inverter to the V2L terminal, in response that the power state is determined as the second power state in the power state determination unit, generate the first control signal for controlling the first power conversion and the second power conversion of the inverter, the second control signal for transmitting the first power of the inverter to the charge load terminal and transmitting the second power of the inverter to the V2L terminal, a third control signal for controlling fourth power conversion of the converter, and a fourth control signal for transmitting the fourth power of the converter to the V2L terminal, in response that the power state is determined as the third power state in the power state determination unit, generate the first control signal for controlling the first power conversion of the inverter, the second control signal for transmitting the first power of the inverter to the charge load terminal, a third control signal for controlling third power conversion of the converter, and a fourth control signal for transmitting the third power of the converter to the electric load terminal, in response that the power state is determined as the fourth power state in the power state determination unit, generate the first control signal for controlling the first power conversion of the inverter, and the second control signal for transmitting the first power of the inverter to the electric load terminal, and the power state is determined as the fifth power state in the power state determination unit, generate the first control signal for controlling the first power conversion of the inverter, the second control signal for transmitting the first power of the inverter to the charge load terminal, the third control signal for controlling the third power conversion of the converter, and the fourth control signal for transmitting the third power of the converter to the electric load terminal.

8. The apparatus of claim 7, wherein the inverter includes:

a first inverter operating under the control of the controller to convert the regenerative power into the first power for the electric load; and a second inverter operating under the control of the controller to convert the regenerative power into the second power for V2L power.

9. The apparatus of claim 7, wherein the converter includes:

a first converter operating under the control of the controller to convert the power of the battery into the third power for the electric load; and a second converter operating under the control of the controller to convert the power of the battery into the fourth power for V2L power.

10. The apparatus of claim 8, wherein the main distributor includes:

a first distributor configured to transmit the first power of the first inverter to the charge load terminal under the control of the controller; and a second distributor configured to transmit the second power of the second inverter to the V2L terminal under the control of the controller.

11. The apparatus of claim 9, wherein the sub-distributor includes:

a third distributor configured to transmit the third power of the first converter to the electric load terminal under the control of the controller; and a fourth distributor configured to transmit the fourth power of the second converter to the V2L terminal under the control of the controller.

12. A method for converting and distributing regenerative power from a vehicle, the method comprising:

a power distribution control operation of permitting or restricting, by a controller, a V2L function between the vehicle and a preset electric load depending on a state of charge (SOC) value of a battery, and comparing an amount of regenerative power generated from a motor according to regenerative braking with a preset electric load required power amount or a V2L required power amount of the preset load, and controlling an operation of converting the regenerative power according to a comparison result and distribution of the converted regenerative power;

an inverter operating operation of converting the regenerative power into at least one power of a first power for a vehicle electric load, a second power for a V2L terminal, and power of the battery, under control of the controller; and a main power distribution operation of distributing the first power, the second power, and the power of the battery to an electric load terminal, the V2L terminal, and the battery in response that the V2L function is permitted, and distributing the first power to the electric load terminal in response that the V2L function is restricted, under the controller of the controller.

13. The method of claim 12, further including:

a converter operating operation of converting the power of the battery into a third power for the electric load or a fourth power for the V2L terminal under control of the controller in response that the regenerative power is insufficient, as compared to a predetermined required power, according to the comparison result in the power distribution control operation; and a sub-power distribution operation of distributing the third power to the electric load terminal or distributing the fourth power to the V2L terminal, under the control of the controller, in response that the regenerative power is insufficient.

14. The method of claim 13, wherein the power distribution control operation includes:

an operation mode determination operation of determining a first operation mode of permitting the V2L function or a second operation mode of restricting the V2L function depending on the state of charge of the battery;

a power state determination operation of, in the first operation mode, determining a power state as one of a first power state, a second power state, and a third power state by comparing the amount of the regenerative power, the electric load required power amount, and the V2L required power amount, and in the second operation mode, determining the power state as one of a fourth power state and a fifth power state by comparing the amount of the regenerative power and the electric load required power amount; and a control signal generation operation of generating a first control signal for controlling an inverter, a second control signal for controlling a main distributor, a third control signal for controlling a converter, and a fourth control signal for controlling a sub-distributor, according to the determination of the power state determination operation, wherein the inverter, the main distributor, the converter, and the sub-distributor are operatively connected to the controller.

15. The method of claim 14, wherein in the operation mode determining operation, the state of charge is compared with a reference state of charge, and in response that the state of charge is greater than or equal to the reference state of charge, a mode signal for determining a first operation mode of permitting the V2L function is outputted, and in response that the state of charge is less than the reference state of charge, a mode signal for determining a second operation mode of restricting the V2L function is outputted.

16. The method of claim 15, wherein the power state determination operation includes:

an addition operation of obtaining a total required power by adding the electric load required power amount and the V2L required power amount; and a power state determination operation of determining a power state of the regenerative power by comparing the amount of the regenerative power with at least one of the total required power, the electric load required power amount, and the V2L required power amount, in the first operation mode or the second operation mode, wherein in the power state determination operation, in a case of the first operation mode, which is a mode of permitting the V2L function, the power state is determined as the first power state in response that the regenerative power is greater than or equal to the total required power, the power state is determined as the second power state in response that the regenerative power is lower than the total required power and is greater than or equal to the electric load required power amount, the power state is determined as the third power state in response that the regenerative power is lower than the electric load required power amount, in a case of the second operation mode, the power state is determined as the fourth power state in response that the regenerative power is greater than or equal to the electric load required power amount, and the power state is determined as the fifth power state in response that the regenerative power is lower than the electric load required power amount.

17. The method of claim 16, wherein in the control signal generation operation, in response that the power state is determined as the first power state in the power state determination operation, a first control signal for controlling first power conversion and second power conversion of the inverter, and a second control signal for transmitting the first power of the inverter to a charge load terminal and transmitting the second power of the inverter to the V2L terminal are generated, in response that the power state is determined as the second power state in the power state determination operation, the first control signal for controlling the first power conversion and the second power conversion of the inverter, the second control signal for transmitting the first power of the inverter to the charge load terminal and transmitting the second power of the inverter to the V2L terminal, a third control signal for controlling fourth power conversion of the converter, and a fourth control signal for transmitting the fourth power of the converter to the V2L terminal are generated, in response that the power state is determined as the third power state in the power state determination operation, the first control signal for controlling the first power conversion of the inverter, the second control signal for transmitting the first power of the inverter to the charge load terminal, a third control signal for controlling third power conversion of the converter, and a fourth control signal for transmitting the third power of the converter to the electric load terminal are generated, in response that the power state is determined as the fourth power state in the power state determination operation, the first control signal for controlling the first power conversion of the inverter, and the second control signal for transmitting the first power of the inverter to the electric load terminal are generated, and in response that the power state is determined as the fifth power state in the power state determination operation, the first control signal for controlling the first power conversion of the inverter, the second control signal for transmitting the first power of the inverter to the charge load terminal, the third control signal for controlling the third power conversion of the converter, and the fourth control signal for transmitting the third power of the converter to the electric load terminal are generated.

18. The method of claim 17, wherein the inverter operating operation includes:

a first inverter operating operation of operating under the control of the controller to convert the regenerative power into the first power for the electric load; and a second inverter operating operation of operating under the control of the controller to convert the regenerative power into the second power for V2L power.

19. The method of claim 18, wherein the inverter includes a first inverter and a second inverter, and wherein the main power distribution operation includes:

a first distribution operation of transmitting the first power of the first inverter to the charge load terminal under the control of the controller; and a second distribution operation of transmitting the second power of the second inverter to the V2L terminal under the control of the controller.

20. The method of claim 19, wherein the main power distribution operation includes:

a first converter operating operation of converting the power of the battery into the third power for the electric load under the control of the controller in response that the regenerative power is insufficient, as compared to the electric load required power amount; and a second converter operating operation of, in a first operation mode of permitting the V2L function, converting the power of the battery into the fourth power for the V2L power under the control of the controller in response that the regenerative power is insufficient as compared with a total required power obtained by adding the electric load required power amount and the V2L required power amount and exceeds the electric load required power amount, wherein the sub-power distribution operation includes:

a third distribution operation of transmitting the third power of the first converter to the electric load terminal under the control of the controller; and a fourth distribution operation of transmitting the fourth power of the second converter to the V2L terminal under control of the controller.

* * * * *